FIG. I

Dec. 29, 1970  M. S. KONSTANTINOV ET AL  3,550,475

REDUCTION-GEAR MOTOR

Filed May 9, 1969  3 Sheets-Sheet 2

Mihail S. Konstantinov
Dragomir S. Dragiev
Penka J. Genova
Petar I. Tzenov
INVENTORS.

BY

*Karl F. Ross*
*Attorney*

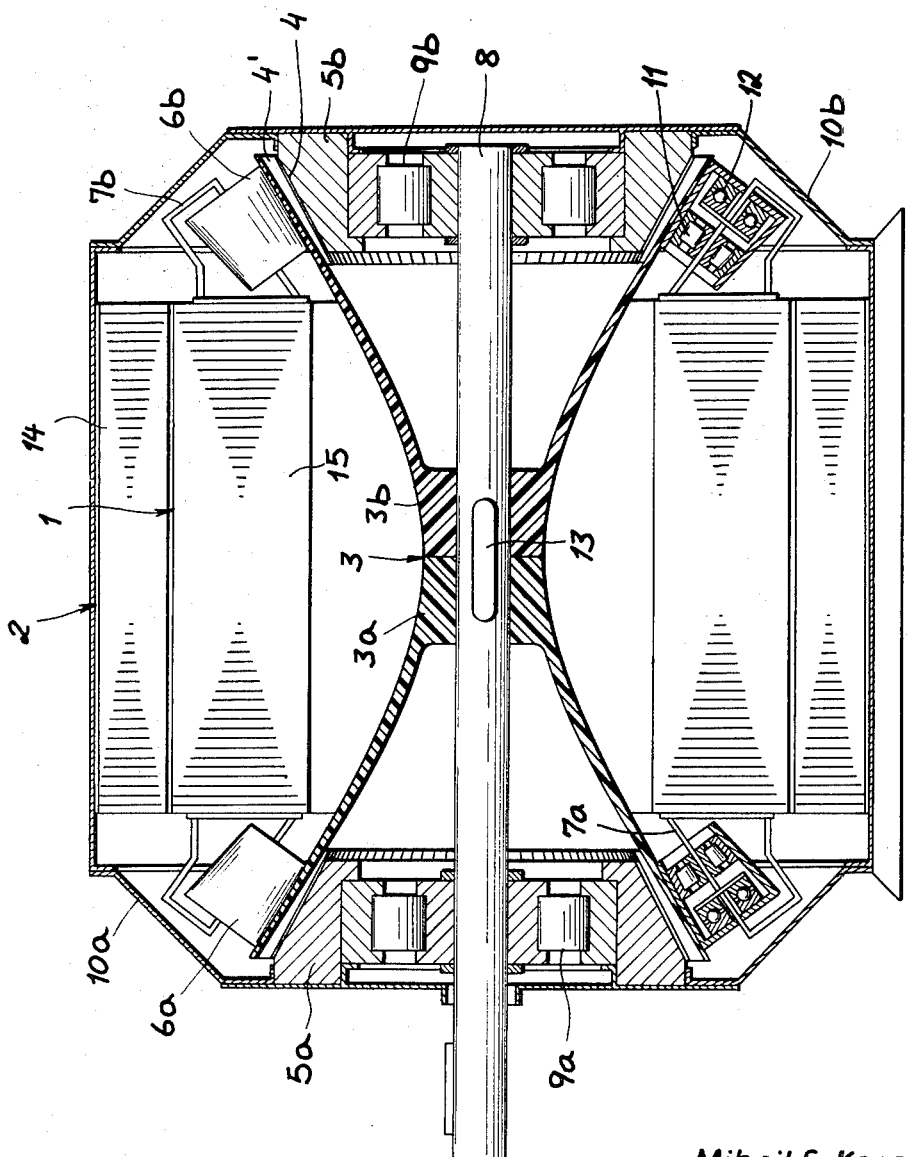

United States Patent Office 3,550,475
Patented Dec. 29, 1970

3,550,475
REDUCTION-GEAR MOTOR
Mihail Spirov Konstantinov, Sofia, Dragomir Svetoslavov Dragiev, Botevgrad, and Penka Jossifova Genova and Petar Ivanov Tzenov, Sofia, Bulgaria, assignors to Vish Machino-Flektrotechnitcheski Institut, Sofia, Bulgaria, a corporation of Bulgaria
Continuation-in-part of application Ser. No. 700,845, Jan. 26, 1968. This application May 9, 1969, Ser. No. 823,264
Claims priority, application Bulgaria, Jan. 28, 1967, 7,464
Int. Cl. F16h *33/00*
U.S. Cl. 74—640          10 Claims

ABSTRACT OF THE DISCLOSURE

A torque transmitter of the strain-wave type comprises three relatively rotatable coaxial bodies, i.e., an externally toothed rigid inner body secured to a stator, an internally toothed intermediate rotor of deformable material, and a driven outer rotor carrying two sets of frustoconical rollers which bear upon the intermediate rotor at peripherally spaced locations to force the internal teeth thereof into progressively shifting engagement with the external teeth of the inner body. The two toothed bodies have each the shape of a bambinoid, i.e., of a surface of revolution generated by an imaginary cylinder rotating about an axis which lies skew to all its generatrices.

---

This application is a continuation-in-part of our copending application Ser. No. 700,845, filed Jan. 26, 1968, now abandoned.

Our present invention relates to strain-wave gearing of the type disclosed, for example, in U.S. Pat. No. 3,178,963.

As disclosed in that patent, an output shaft is rotated with the aid of a torque transmitter which includes three relatively rotatable coaxial bodies, i.e., a primary rotor powered by suitable drive means such as a rotating magnetic field, a stator, and a secondary rotor interposed between the stator and the primary rotor. The stator and the secondary rotor are provided with coacting gear teeth which are normally disengaged except where forcibly brought into mesh by a strain inducer in the form of two sets of rollers carried at axially spaced locations on the primary rotor, the secondary rotor consisting for this purpose of deformable material. Since the number of teeth around the circumference of the secondary rotor differs from the number of coacting teeth on the confronting circumference of the stator, the secondary rotor (which is rigid with the output shaft) turns at an output speed $S_o$ related to the input speed $S_i$ of the primary rotor by the ratio $$S_o/S_i = (N_1 - N_2)/N_1$$

where $N_1$ is the number of teeth on the rigid stator and $N_2$ is the (lesser) number of teeth on the deformable secondary rotor or flexspline.

In prior systems of this type, e.g., as shown in the aforementioned patent, the two toothed coaxial bodies are of either cylindrical or frustoconical configuration. The cylindrical shape is considered disadvantageous because of the uneven axial deformation of the flexspline at the point of contact. The use of two oppositely oriented frustocones remedies this drawback and also provides an axial force component to help center the rotatable assembly. On the other hand, a generally cylindrical portion is usually required in order to join the frustoconical body to an output shaft or similar support, this junction creating a zone of structural weakness.

It is, therefore, the general object of our present invention to provide and improved torque transmitter of the aforedescribed type in which all discontinuous transition zones are avoided, thus resulting in a structure of greater stress resistance particularly in regard to torsional forces.

A related object is to provide a yieldable toothed body, or flexspine, for the purpose set forth which is more easily deformable than conventional cylindrical or conical bodies of the same maximum diameter and thickness.

These objects are realized, pursuant to our present invention, by providing the complementary gear teeth of the two intermeshing coaxial bodies on a pair of surfaces of revolution, hereinafter referred to by the term "baminoid," generated by an imaginary cylinder rotating about an axis which lies skew to all its generatrices, being thus located at a distance from the cylinder axis greater than the cylinder radius.

A limiting case of the bambinoid is the one-sheet hyperboloid which comes into existence when the radius of the cylinder decreases to zero, i.e., when the cylinder turns into a straight line; in contradistinction to the cylinder and the cone, the bambinoid and the one-sheet hyperboloid are not developable surfaces. Thus, two of the three coaxial bodies of a torque transmitter according to our invention, one of them being deformable, have the shapes of bambinoids as defined above (including the limiting case of the one-sheet hyperboloid), the confronting surfaces of these bambinoidal bodies being provided with teeth of different angular spacing or pitch as in the conventional strain-wave gearing. It is to be understood that the nondeformable or rigid bambinoid body may either surround or be surrounded by the deformable body or flexspine.

The invention will be described in greater detail hereinafter with reference to the accompanying drawing in which:

FIG. 4 is an axial sectional view of a torque transmitter with bambinoidal surfaces according to our invention.

Figure 1:
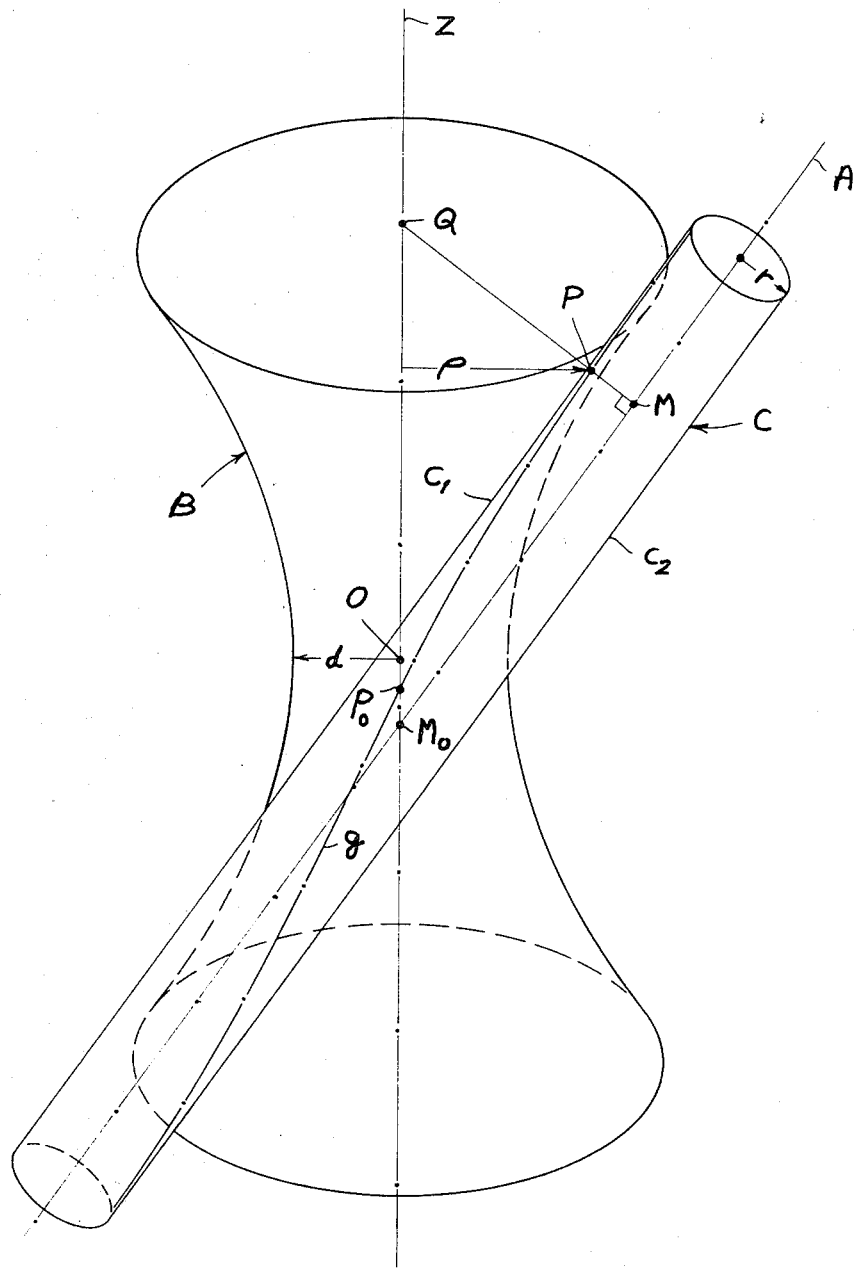
FIG. 1 is an isometric view of a bambinoid, as defined above, with its generating cylinder.
Figure 2:
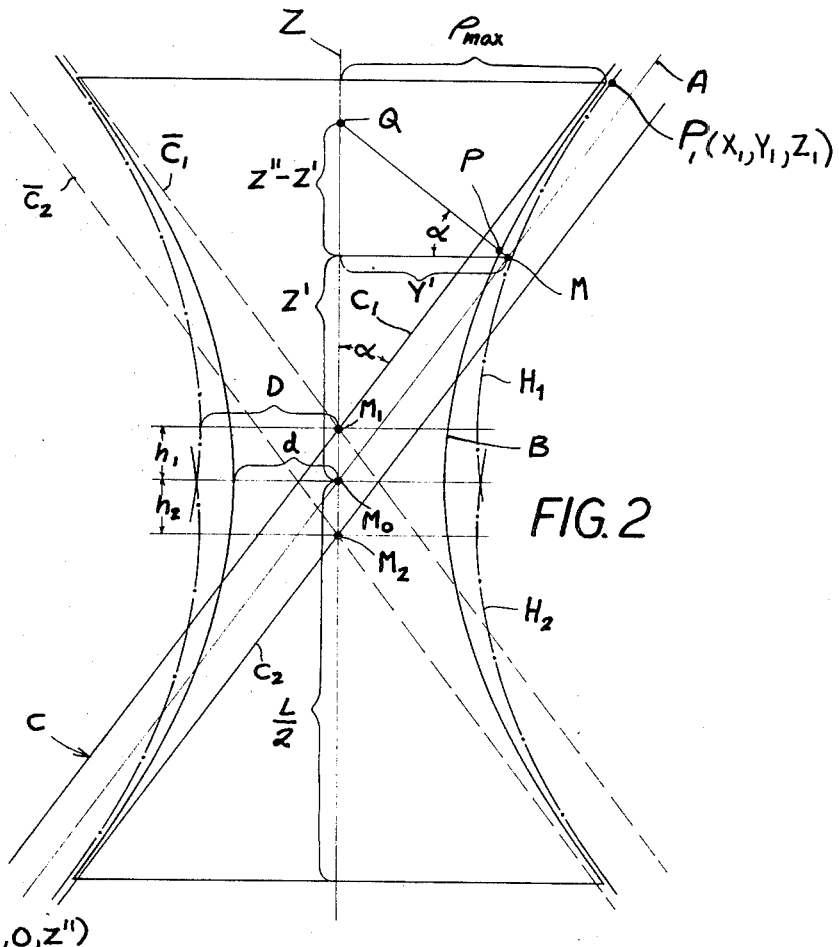
FIGS. 2 and 3 are explanatory diagrams relating to the geometrical shapes of FIG. 1.
Figure 3:
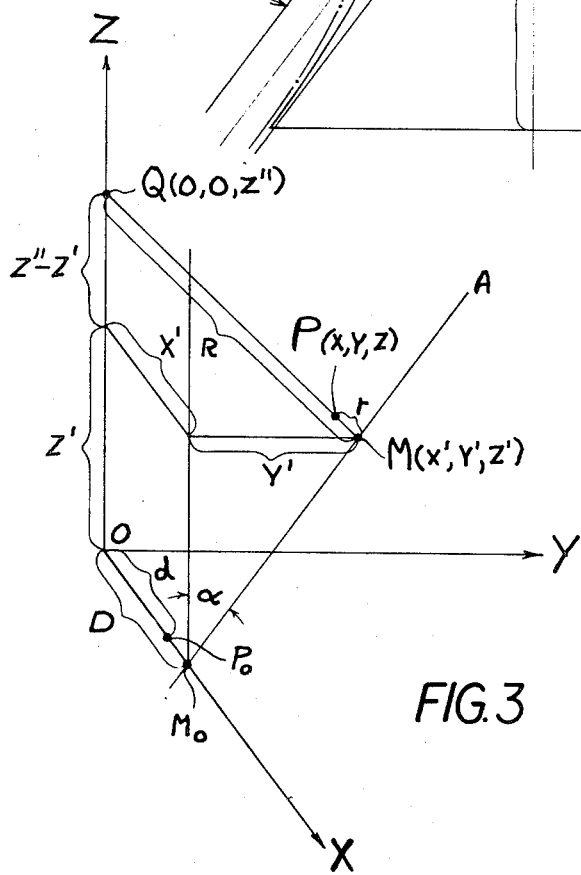

In FIGS. 1, 2 and 3, we have shown at B a segment of a bambinoid centered on a vertical axis Z. A cylinder C of radius $r$ has an axis A which extends skew to the axis Z, being separated from it by a distance $D > r$ so that the minimum distance between the cylinder and the axis Z is $d = D - r$. This distance $d$ represents, accordingly, the minimum radius of the figure of revolution B at the waistline of the bambinoid.

Given a point M on axis A whose coordinates is an orthogonal system X, Y and Z (centered on an origin O) are $x'$, $y'$ and $z'$, the coordinates $x$, $y$, $z$ of a point P on the surface of the bambinoid can be determined from the following considerations.

Let $\alpha$ be the angle included between the axis Z and an axial plane of cylinder C passing through the origin O. Let us further consider the point $P(x, y, z)$ as located on a straight line, perpendicular to axis A, which extends from the point $M(x', y', z')$ to a point $Q(O, O, z'')$ on axis Z, with the distance $P-M$ equal to $r$ and the distance $Q-M$ equal to R. Since $$y' = z' \tan \alpha \tag{1}$$

and $$z'' - z' = y' \tan \alpha \tag{2}$$

while $$x' = D \tag{3}$$

we can write $$R = x'^2 + y'^2 + (z'' - z')^2 \tag{4}$$

whence $$R^2 = D^2 - z'^2 \tan^2 \alpha / \cos^2 \alpha \tag{5}$$

From the geometry of the system, we further find that:

$$x = x'(R-r)/R \quad (6)$$
$$y = y'(R-r)/R \quad (7)$$

and $$z = z' + (z''-z')(R-r)/R \quad (8)$$

whence, by substitution of the previously established values for R, $x'$, $y'$ and $z''$, we find the values $x$, $y$ and $z$ as functions of the variable $z'$ in terms of the given parameters $\alpha$, D and $r$. The radius $\rho$ of the bambinoid at point P is given by the expression $$\rho^2 = x^2 + y^2 \quad (9)$$

at the waistline of the bambinoid, this radius attains its minimum value which is equal to $d$.

The point P lies on a curved line $g$ which passes through a point $P_0$ confronting the center O of the bambinoid, the distance $O-P_0$ being equal to $d$. Curve $g$ is a generatrix of bambinoid B and, with increasing distances from $P_0$, asymptotically approaches the two generatrices $c_1$ and $c_2$ of the cylinder C which lie in an axial plane perpendicular to the line $O-P_0$. Thus, with increasing values of $\pm z$ the two halves of the bambinoid B approach the shape of respective hyperboloids $H_1$, $H_2$ (FIG. 3) generated by the rotation of lines $c_1$ and $c_2$ about axis Z. The centers of these hyperboloids are two points $M_1$ and $M_2$ separated from point $M_0$ by distances $h_1$ and $h_2$, each numerically equal to $r/\sin \alpha$. The real half-axis of each hyperboloid $H_1$, $H_2$ has the magnitude D while its imaginary half-axis has the magnitude $D \cot \alpha$.

It will be apparent that if $r$ decreases toward zero, the two hyperboloids $H_1$ and $H_2$ approach each other and finally merge, along with bambinoid B, into a single hyperboloid.

In FIG. 3 the cylinder generatrices $c_1$ and $c_2$ have been illustrated in solid lines in the position of FIGS. 1 and 2; their mirror images $\bar{c}_1$ and $\bar{c}_2$, shown in broken lines, represent the cylinder C after half a revolution about axis Z.

When utilizing a bambinoidal surface as a tooth carrier for a strain-wave gearing as outlined above, and as more fully described hereinafter with reference to FIG. 4, it will be desirable to locate the gear teeth in an annular zone, bounded by the radius $\rho_{\max}$ in FIG. 3, in which the bambinoid closely approaches its asymptotic cone described by the generating line $c_1$ (or $c_2$) of the imaginary cylinder C. If we consider a point $P_1(x_1, y_1, z_1)$ located on the hyperboloid $H_1$ at the level of radius $\rho_{\max}$, we find its coordinates from the hyperbolic equation:

$$y_1^2/D^2 - (z_1-h_1)^2/D^2 \cot^2 \alpha = 1 \quad (10)$$

Point $P_1$, and therefore the corresponding point on the bambinoid B, lies close to the asymptote $c_1$ if $$(z_1-h_1)^2 \tan^2 \alpha \gg D^2 \quad (11)$$

Since, as noted above, $$h_1 = r/\sin \alpha \quad (12)$$

and given the relationship $$z_1 = L/2 \quad (13)$$

where L is the axial length of the bambinoidal surface, inequality (11) can be rewritten as $$\left(\frac{L}{2} \tan \alpha - r/\cos \alpha\right)^2 \gg (d+r)^2 \quad (14)$$

which imposes certain limitations upon the otherwise freely choosable magnitude of $r$. Thus, in general terms, $r$ may range between O and a fraction of $$\frac{L}{2} \sin \alpha$$

the value of $\alpha$ being given by $$\tan \alpha \approx 2\rho_{\max}/L \quad (15)$$

In most instances, $\alpha$ will not be greater than about 45°.

In FIG. 4 we have illustrated a torque transmitter according to our invention which comprises a primary rotor 1, a stator 2 and a secondary rotor 3, the latter being keyed at 13 to an output shaft 8 which is journaled in bearings 9a, 9b lodged within a pair of annular members 5a, 5b rigid with stator 2.

A secondary rotor 3, split for convenience of assembly into two symmetrical halves 3a and 3b, consists of a mostly tubular body of elastically deformable sheet material having the bambinoidal shape described in conjunction with FIGS. 1–3. A similar configuration is given to the outer surface of the rigid rings 5a and 5b, this surface being formed with peripheral teeth 4 confronting similar teeth 4' on the inner surface of rotor 3 at the extremities of its halves 3a and 3b. Two sets of strain-inducing rollers 6a, 6b are rotatably mounted, with the aid of bearings 11, 12, on respective axles 7a, 7b carried by the rotor 1. Stator 2 is fixedly secured to rings 5a, 5b through the intermediary of annular housing portions 10a, 10b.

At 14 we have shown part of a conventional stator armature, in the form of ferromagnetic laminations, which is energizable by windings not illustrated to generate a magnetic field rotating about the axis of shaft 8. A confronting rotor armature, carried by the body 1, is represented by similar laminations 15 and serves to entrain that body, thereby imparting rotation to the two sets of strain-inducing rollers 6a, 6b, respectively, the rollers of each set (only two shown) being uniformly distributed about the periphery of rotor 3.

The contacting generatrices of the frustoconical rollers 6a, 6b define a pair of frustocones centered on the axis of shaft 8, it being apparent that these frustocones (because of the nondeformability of rings 5a and 5b) cannot quite coincide with the cones generated in FIG. 3 by the lines $c_1$ and $c_2$. Thus, the apices of these cones will generally lie in the vicinity of the center of the bambinoidal body 3, i.e., in the region between points $M_1$ and $M_2$ of FIG. 3. The individual axes of the rollers of each set advantageously converge upon the rotor axis in the same region.

It will thus be seen that the rotor 3, whether split into two surfaces (as shown) or made in one piece, has a continuous outer surface from its toothed extremities to its central region in which it is positively connected with the shaft 8. The nearly cylindrical supporting portion can be of greatly reduced axial length, as compared with the length of the tubular portions, so that the major part of each rotor half is freely deformable.

Similar advantages will be realized if, as generally shown in the above-identified Pat. No. 3,178,963, the rollers 6a, 6b are disposed inside the flared extremities of body 3, with the rings 5a, 5b internally toothed and surrounding these flared extremities. Moreover, output shaft 8 could be secured to the rigid body 5a, 5b while the flexible body 3 is held stationary against the housing 2, 10a, 10b.

We claim:
1. A torque transmitter comprising three relatively rotatable coaxial bodies including a first body connected to a source of driving torque, a toothed second body provided with output means and a toothed third body held against rotary entrainment by said source, said second and third bodies being provided with confronting surfaces carrying complementary gear teeth of different angular pitch, one of said toothed bodies being deformable, said first body being provided with strain-inducing means contacting said deformable body along a limited peripheral area revolving about the common axis of said bodies at the rate of rotation of said first body about said axis whereby said toothed bodies are relatively displaced at a speed corresponding to a fraction of said rate of rotation; each of said toothed bodies having a tooth-bearing surface substantially in the shape of a nondevelopable figure of revolution generated by an imaginary cylinder rotating about said common axis, said cylinder having an axis which is skew to said common axis and spaced therefrom by a distance greater than the cylinder radius, said radius ranging between zero and a fraction of the axial length of said deformable body.

2. A torque transmitter as defined in claim 1 wherein said confronting surfaces are divided into two axially spaced annular zones equidistant from the waistline of said figure of revolution.

3. A torque transmitter as defined in claim 2 wherein said strain-inducing means comprises two sets of rollers having axes converging near the center of said waistline.

4. A torque transmitter as defined in claim 3 wherein said rollers are of frustoconical shape with apices substantially coinciding with the point of convergence of their axes.

5. A torque transmitter as defined in claim 1 wherein said deformable body is said second body, said output means comprising a shaft secured to said second body.

6. A torque transmitter as defined in claim 5 wherein said third body is part of a stator provided with bearing means for said shaft.

7. A torque transmitter as defined in claim 6 wherein said source of driving torque comprises winding means on said stator for generating a rotating magnetic field, said second body being provided with follower means entrainable by said field.

8. A torque transmitter as defined in claim 5 wherein said second body has a solid central portion secured to said shaft and flared tubular portions carrying said gear teeth on their extremities.

9. A torque transmitter as defined in claim 8 wherein the axial length of each of said tubular portions substantially exceeds the axial length of said central portion.

10. A torque transmitter as defined in claim 8 wherein said second body is axially split at the middle of said central portion.

References Cited
UNITED STATES PATENTS 3,187,605   6/1965   Stiff _____ 74—640

LEONARD H. GERIN, Primary Examiner